United States Patent

Karel

[15] 3,685,861
[45] Aug. 22, 1972

[54] COUPLING MEMBER FOR AUTOMATIC TRANSMISSION DEVICES

[72] Inventor: George M. Karel, Forest Hills, N.Y.

[73] Assignee: All-O-Matic Manufacturing Corporation, New Hyde Park, N.Y.

[22] Filed: Nov. 12, 1969

[21] Appl. No.: 875,782

[52] U.S. Cl.................................285/382, 85/9
[51] Int. Cl.......................................F16l 13/14
[58] Field of Search.........85/9, 32, 9.32; 92/98, 101; 156/38; 285/202, 205, 222, 382

[56] References Cited

UNITED STATES PATENTS

| | | | |
|---|---|---|---|
| 2,417,703 | 3/1947 | Risk | 151/38 |
| 2,945,524 | 7/1960 | Becker | 151/38 |
| 3,086,421 | 4/1963 | Hamman | 151/38 |
| 841,284 | 1/1907 | Tower | 85/9 R |
| 924,398 | 6/1909 | Stevens | 85/9 R |
| 998,987 | 7/1911 | Recker | 85/9 R |
| 1,505,580 | 8/1924 | Bronson | 85/32 R |
| 1,537,064 | 5/1925 | Bronson | 85/32 R |
| 1,675,597 | 7/1928 | Bronson | 85/32 R |
| 2,817,727 | 12/1957 | Schmeling | 92/101 |
| 3,072,150 | 1/1963 | Hastings et al. | 92/98 |

*Primary Examiner*—Edward C. Allen
*Attorney*—James and Franklin

[57] ABSTRACT

A coupling member used as a connecting cap for a valve modulator in the transmission system of an automobile comprises a first member composed of a comparatively thin-walled material and comprising a flanged part adapted to be joined to the valve and a nut means formed in the flanged part and extending out therefrom. A second member formed of a comparatively thick-walled material is operatively rigidly attached to the first member, and projects outwardly therefrom substantially coaxially with the nut means. This second member is generally in the form of a threaded bolt which is rotated into a secured engagement with an external valve in the transmission system by an application of a torsional force to the nut means. In the preferred embodiment the nut means is provided with an aperture passing therethrough, and a portion of the bolt engages the nut means adjacent the inner end of the aperture, thereby to prevent the first and second members from separating. The aperture is preferably non-circular and the bolt which passes therethrough is correspondingly non-circular in the assembly, thereby defining a means for the interlocking engagement of the first and second members.

2 Claims, 4 Drawing Figures

PATENTED AUG 22 1972  3,685,861
FIG. 2
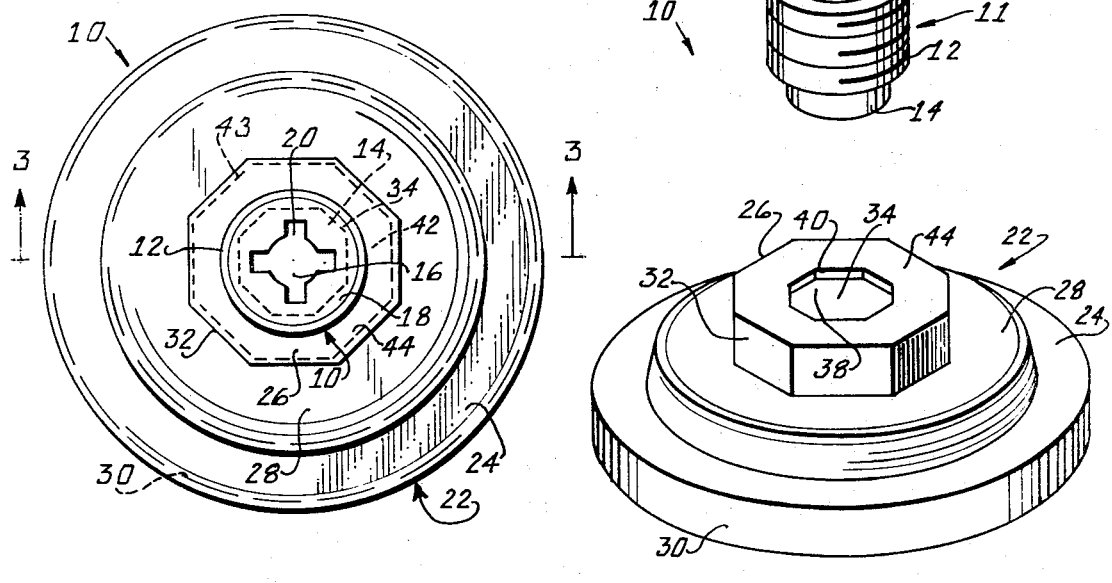
FIG. 1
FIG. 3
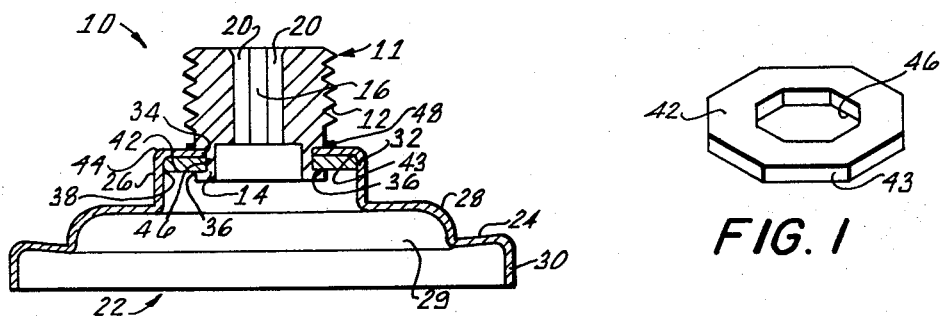
FIG. 4
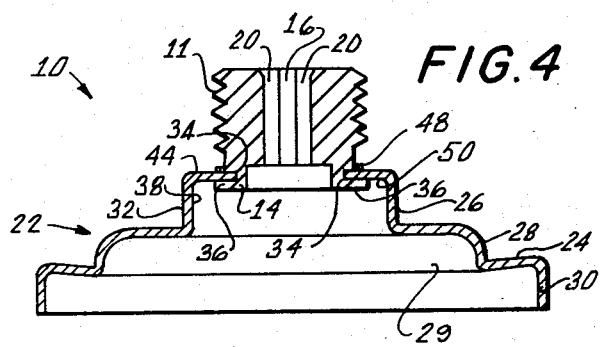
INVENTOR
GEORGE M. KAREL
BY
James and Franklin
ATTORNEY

COUPLING MEMBER FOR AUTOMATIC TRANSMISSION DEVICES

This invention relates generally to coupling members, and more specifically to a mechanical coupling member for connecting a valve modulator into the hydraulic system of the automatic transmission in a motor vehicle.

Automatic transmissions in motor vehicles are generally operated by a variation in hydraulic pressure. The main hydraulic pressure supply is regulated by a series of valves so that the load applied by various clutches and friction points is varied in accordance with engine torque speed and initial gear-shift selector position. These valves are manufactured in different forms, and perform different functions in the system. "-Pressure regulator valve" is a general term which is applied to valves used for pressure relief, compensation, modulation, and throttle adjustment in such a system.

Pressure on the accelerator panel varies the number of engine revolutions per minute by regulating the fuel supply to the carburetor. This in turn causes variations in hydraulic pressure and vacuum conditions. In a typical automatic transmission system these variations are employed to influence positions of a number of control valves. These regulate the fluid flow to servo band systems. A vacuum modulator is generally used to sense vacuum conditions and to regulate hydraulic pressure in accordance with such conditions. This modulator device usually comprises a diaphragm positioned within a fluid-tight housing. The diaphragm moves in response to the vacuum conditions sensed and the movement is usually transmitted through a rod or other linking device to an appropriate valve.

Mounting of these vacuum modulator devices in an automobile must be properly engineered since fluid system linkage must be achieved and at the same time fluid system leakage must be prevented. The devices under discussion are typically provided with a cap which is sealed to the casing, the upper part of which may contain a fluid such as oil. The cap is attached to a threaded bolt which is employed to secure the modulator casing to an external threaded valve body. The bolt is provided with a channel through which the fluid is permitted to pass between the encased modulator and the external valve body. A nut is positioned coaxially with the bolt and is used to rotate the bolt into threaded engagement with the valve body and is also used in positioning the modulator device since the outer surface of the nut is placed against the valve casing.

The manufacture of such casing caps must be carefully controlled so that the attachment of the bolt to the cap is effected without giving rise to fluid leakage. In the past this has been accomplished by machining a standared piece of metal stock to form the nut and the coaxial threaded bolt in one piece. The nut is then brazed to the cap with a binding sealant such as a silver based solder or brass.

This particular method of manufacture is expensive and wasteful, since extensive machining must be carried out on a given piece of stock to provide both a properly shaped nut and a properly dimensioned threaded bolt. During the manufacturing process, many rejected products are produced because of the accuracy with which the machining operations must be carried out.

It is therefore the primary object of this invention to provide a coupling member for use in fluid actuated devices in vehicle automatic transmission systems, which is characterized by its simplicity, excellent sealing and coupling capability, and inexpensive method of manufacture.

In order to avoid the aforementioned difficulties, the coupling member of the invention is fabricated in two parts, as before, but the nature of each of these parts is modified over what has been the case in the past. The first part now comprises a flanged member, typically a casing cap, formed of a comparatively thin-walled material with a nut means integrally formed in the thin-walled flanged member. In the typical manufacturing operation the nut means is stamped or molded in the cap itself in a single manufacturing step thereby eliminating the necessity of machining the nut. A second member, typically a threaded bolt, is separately machined and thereafter attached to the cap member to form the coupling member, preferably without having to employ a welding or brazing operation. With this arrangement the necessity of careful machining to fabricate a unitary part comprising a nut and a bolt is avoided.

The threaded bolt is attached to the cap member in the preferred embodiment by being placed in an aperture in the nut and interlocked therewith so that no relative rotation is permitted. A portion of the bolt engages the nut adjacent the inner end of the aperture, thereby to prevent the cap and the bolt from separating. Preferably, the aperture is non-circular and that part of the bolt which passes through the aperture is correspondingly non-circular, thereby defining the means for the interlocking engagement of the first and second members. In order to assure an air-tight engagement of the parts, a sealant is applied at the junction between the bolt and the nut in the area of the aperture in the nut.

In a more specific form, the coupling member comprises a cap with an externally threaded vent, the cap comprising a sheet metal body having a depending flange adapted to fit around an external chamber such as the casing of a pressure regulating valve. A domed section extends up from the flange, and a nut section extends up from the domed section. A nut section is provided with a non-circular outer periphery and comprises a top wall with a non-circular aperture therethrough. A substantially solid screw member having a first externally threaded section rests on an extends up from the top wall. A second section of the screw member extends down from the aperture and is non-circularly shaped corresponding to the aperture. The second section of the screw member is provided with a portion operatively engaging and extending beneath the top wall. The screw member sections are provided with a passage therethrough for the passage of fluid into and out of the chamber. The nut section is provided with an inner periphery and a reinforcing member of a peripheral shape corresponding to that of the inner periphery of the nut section is secured beneath the top wall. This reinforcing member operatively engages a portion of the thin-walled nut section and strengthens it during the application of torsional force thereto.

To the accomplishment of the above, and to such other objects as may hereinafter appear, the present invention relates to a coupling member as defined in the appended claims, and as described in the accompanying drawing in which:

FIG. 1 is a perspective exploded view of the components of the coupling member prior to the assembly thereof;

FIG. 2 is a top plan view of the assembled coupling member illustrated in FIG. 1;

FIG. 3 is a front sectional view taken on line 3—3 of FIG. 2; and

FIG. 4 is a view similar to FIG. 3 but of a second embodiment of the present invention.

The components of a coupling member 10 typical of the invention are illustrated in FIG. 1 prior to assembly, and are shown in their assembled condition in FIGS. 2 and 3. In FIG. 1, the coupling member 10 comprises three main parts in the embodiment illustrated; a threaded bolt generally designated 11, a cap member generally designated 22, and a reinforcing member 42. When the coupling member 10 is assembled (FIGS. 2 and 3), the bolt 11 is attached to the cap member 22 and projects therefrom so as to be adapted to be joined to a threaded receptacle such as a threaded conduit in a fluid system. Similarly, the cap member 22 is adapted to fit around an external chamber (not shown). The washer 42 fits within a nut section 26 and reinforces the same during the application of torsional forces thereto as will hereinafter be further explained. The attachment of bolt 11 to part 22 is such that the bolt extends outwardly coaxially with nut section 26.

Referring again to FIG. 1, the threaded bolt 11 comprises a first section 12 having a threaded outer periphery and a second section 14 of reduced diameter extending from the section 12. The section 14 is preferably initially circular in cross section and hence the bolt 11 may readily be made in quantity on an automatic screw machine. A passage 16 extends through the bolt 11 from its upper surface 18. This passage 16 is generally employed for the passage of fluid through the bolt 11 and to the valve to which the bolt is attached in a fluid system. Sometimes the passage 16 is employed to receive a rod (not shown) or other linking device such as the type employed in an automatic vehicle transmission system in pressure regulator valves. In this latter application, radially outwardly extending sections 20 are provided for the passage of fluid through the bolt 11 and around the rod when it is positioned within the passage 16.

The second part 22 of the coupling member 11 comprises a laterally extending section 24, a nut section 26, and a domed section 28. The entire part 22 is formed of a comparatively thin-walled material such as sheet metal or plastic, all of the sections thereof, i.e. 24, 26 and 28 being formed into a one piece structure. This greatly facilitates fabrication of the part 22 and the assembly of the coupling member 10. The excessive and difficult machining operations formerly required to form bolt 11 with a nut as a one-piece product is eliminated by forming the thin walled nut section 26 in the cap member 22.

The section 24 of cap member 22 is provided with a depending flange 30 which is adapted to fit about an external chamber and to secure the cap member 22 thereto. The domed section 28 defines a space 29 for receiving a pressure sensitive movable diaphragm (not shown) when the external chamber is a pressure regulated valve in a transmission system.

The nut section 26 is here illustrated as having a non-circular outer periphery 32 and is typically employed to receive the torsional force applied during the connection of the coupling member 10, that is, during the rotational engagement of bolt 11 with an external conduit. A non-circular opening 34 extends through the nut 26, as best shown in FIG. 3. This opening 34 receives the section 14 of the bolt 10 during the assembly of the coupling member. As shown in one embodiment in FIGS. 3 the section 14 of the bolt 11 is flared out and spun over at its end section 36 after it has been assembled with the coupling part 22, thereby to engage the undersurface of the nut 26. When the section 36 is flared in this manner, that portion of the section 14 which is positioned inside the edge 40 of nut 26 assumes the same non-circular configuration as that of the edge 40, thereby effecting the interlocking engagement between members 11 and 22 and preventing relative rotation therebetween.

Since a torsional force is to be applied to the nut 26 during the manipulation of the coupling member, it is preferred that a reinforcing washer 42 be secured beneath the top wall 44 of the nut 26. The washer 42, best illustrated in FIG. 1, is provided with an outer periphery 43 having a configuration corresponding to that of the inner surface 38 of the nut 26. The washer 42 is provided with an aperture 46 which has a non-circular shape corresponding to that of the aperture 34 in the nut 26. As shown in FIG. 3, the bolt section 14 passes through the aperture 46 in the washer 42. When the section 14 is flared out as described above, it conforms to the aperture 46 just as it does to the nut opening 34.

After bolt 11 is attached to the member 22, as above described, a sealant 48 is applied around the bolt 11 where it meets the member 22 as illustrated in FIGS. 3 and 4. The sealant 48 not only surrounds and closes off the line of junction between the bolt 11 and the member 22, but also flows into and fills any spaces therebetween, thereby ensuring an effective and reliable seal between the members and preventing any fluid leakage therebetween. Because of the interlock between the bolt 11 and the member 22 the sealant 48 plays no real part in securing those elements together, and hence a relatively inexpensive lead-based solder such as a composition of 40 percent lead and 60 percent tin can be used in a simple melting operation. This is a decided advantage when compared with a brazing operation performed on silver-based solder such as has been necessitated in the prior art where the solder had to provide a high-strength bond between the parts as well as produce an appropriate fluid-tight seal.

FIG. 4 illustrates another embodiment in which the reinforcing washer 42 has been eliminated. This embodiment may be employed in applications in which a reduced torsional force is applied to the nut section 26 during the connection of bolt 11. In this embodiment the flared end 36 of bolt section 14 directly engages the underside 50 of nut section 26 in a similar manner as its engagement with reinforcing washer 42 in the embodiment of FIGS. 1–3.

The fabrication of the entire assembly is greatly facilitated by the ability to manufacture the cap member 22 with the nut 26 as one piece in a single operation. For this purpose the cap member 22 may be composed of any relatively thin-walled malleable material which is rigid in its final form. Sheet metal having a thickness of about 0.030 inch has been successfully employed in the construction of cap member 22. The nut section 26 may therefore be formed by the same conventional methods currently used to fabricate the cap itself and from the same thin-walled material.

The relatively thick-walled bolt may be composed of a lead-free steel which is readily machined. While the section 14 which forms a part of the bolt 11 is illustrated as being circular in its pre-assembled form, it may be initially non-circularly shaped to correspond to the shape of the inner edge 40 of the nut 26. However, the machining operation which is carried out to produce the bolt 11 is simplified by maintaining a circular periphery on the section 14. The diameter of this section is such that when placed on the non-circular aperture 34 an interference fit results. Subsequent flaring of the edge 36 of this section 14 causes the periphery of the section 14 to tightly engage the octagonal edge 40 and assume a similar octagonal shape.

From the foregoing it will be appreciated that the cap structure described is effective as a coupling member for a valve modulator in a hydraulic system. The coupling member provides a fluid-tight connection between the casing of a fluid actuated valve and an external conduit in an automatic transmission system of a motor vehicle. The coupling member is inexpensive to manufacture because of the incorporation of a nut into the cap itself, thereby eliminating costly machining during the fabrication process. A rigid attachment is achieved by employing a non-circular opening in the formed nut and a correspondingly non-circular periphery on the bolt passing through the aperture in its finally assembled form.

Although only one embodiment of the invention has been described, many modifications thereof may be made without departing from the scope of the invention.

I claim:

1. A cap with an externally threaded vent comprising a sheet metal body having a depending flange adapted to fit around an external chamber, a domed section extending up from said flange, and an externally nut-shaped section extending up from said domed section, said nut-shaped section having a non-circular outer periphery and comprising a top wall with a non-circular aperture therethrough, and a substantially solid screw member having a first externally threaded section resting on and extending up from said top wall and a second section extending down through, and correspondingly non-circularly shaped to, said aperture, said second section having a portion operatively engagingly extending beneath said top wall, said screw member sections having a passage therethrough, said first section of said screw member being adapted to be threadedly attached to an external conduit, in which said external nut-shaped section has an inner periphery and a reinforcing member of peripheral shape corresponding to that of said inner periphery secured beneath said top wall.

2. The cap of claim 1, in which said reinforcing member is secured between said top wall and said operatively engaging portion of said second screw member section.

* * * * *